(12) United States Patent
Bauer et al.

(10) Patent No.: US 12,313,100 B2
(45) Date of Patent: May 27, 2025

(54) HYDRAULIC ARRANGEMENT

(71) Applicant: Danfoss Power Solutions ApS, Nordborg (DK)

(72) Inventors: Thomas Bauer, Sydals (DK); Niels Bjarne Hansen, Aabenraa (DK); Poul Ennemark, Sønderborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 0 days.

(21) Appl. No.: 18/662,197

(22) Filed: May 13, 2024

(65) Prior Publication Data

US 2024/0392814 A1    Nov. 28, 2024

(30) Foreign Application Priority Data

May 23, 2023 (EP) .................................. 23174895

(51) Int. Cl.
*F15B 13/04* (2006.01)
*F15B 13/02* (2006.01)
(Continued)

(52) U.S. Cl.
CPC .............. *F15B 20/00* (2013.01); *F15B 13/02* (2013.01); *F15B 13/0402* (2013.01);
(Continued)

(58) Field of Classification Search
CPC ............. F15B 13/0402; F15B 13/0426; F15B 13/0428; F15B 2211/30525; F15B 2211/311; F15B 2211/3144; F15B 2211/3157; F15B 2211/31576; F15B 2211/329; F15B 2211/355
See application file for complete search history.

(56) References Cited

U.S. PATENT DOCUMENTS 5,044,256 A * 9/1991 Budzich .................. E02F 9/226
                                                    137/596.1
5,784,944 A * 7/1998 Tozawa ................... F15B 20/00
                                                    91/461
(Continued)

FOREIGN PATENT DOCUMENTS

EP         0376023 A2    7/1990

*Primary Examiner* — Michael Leslie
(74) *Attorney, Agent, or Firm* — McCormick, Paulding & Huber PLLC

(57) ABSTRACT

A hydraulic arrangement (1) including a supply port (P), a return port (T), a working port arrangement (L, R), and a valve (2) controlling a supply of hydraulic fluid from the supply port (P) to the working port arrangement (L, R), wherein the valve (2) includes a housing (4) and a spool (3) movable in lengthwise direction in the housing (4) and forming together with the housing (4) at least one flow path the resistance of which depends on the position of the spool (3) in the housing (4), and the spool (3) is actuated by a hydraulic pilot pressure (21, 22) in a pressure chamber (7, 8). In such a hydraulic arrangement a safety functionality should be achieved in a simple way. To this end the housing (4) includes a pilot pressure relief port (20) connected to the return port (T) via a shut-off valve (10) and the spool (3) after a predetermined stroke (13, 14) opens a connection between the pressure chamber (7, 8) and the pilot pressure relief port (20).

17 Claims, 1 Drawing Sheet

(51) Int. Cl.
 *F15B 13/042* (2006.01)
 *F15B 20/00* (2006.01)
 *F15B 11/16* (2006.01)

(52) U.S. Cl.
 CPC ........... *F15B 13/042* (2013.01); *F15B 11/162* (2013.01); *F15B 2211/30525* (2013.01); *F15B 2211/3111* (2013.01); *F15B 2211/3144* (2013.01); *F15B 2211/31576* (2013.01); *F15B 2211/329* (2013.01); *F15B 2211/355* (2013.01)

(56) References Cited

U.S. PATENT DOCUMENTS 6,293,181 B1 * 9/2001 Hajek, Jr. ............. F15B 11/024
 91/464
7,757,714 B2 * 7/2010 Meinhof ............... F15B 13/042
 137/625.6

* cited by examiner

HYDRAULIC ARRANGEMENT

CROSS-REFERENCE TO RELATED APPLICATION

This application claims foreign priority benefits under 35 U.S.C. § 119 from European Patent Application No. 23174895.5, filed May 23, 2023, the content of which is hereby incorporated by reference in its entirety.

TECHNICAL FIELD

The present invention relates to a hydraulic arrangement comprising a supply port, a return port, a working port arrangement having two working ports, and a valve controlling a supply of hydraulic fluid from the supply port to the working port arrangement, wherein the valve comprises a housing and a spool movable in lengthwise direction in the housing and forming together with the housing at least one flow path the resistance of which depends on the position of the spool in the housing, and the spool is actuated by a hydraulic pilot pressure in a pressure chamber.

BACKGROUND

Such a valve arrangement is used to control a hydraulic consumer, like a hydraulic motor or a hydraulic actuator.

The valve arrangement can be remotely controlled by supplying a pilot pressure to the pressure chamber. The pressure in the pressure chamber drives the spool in its lengthwise direction. Depending on the position of the spool in the housing the flow path is established allowing hydraulic fluid to flow from the supply port to one of the working ports of the book port arrangement. This flow path has a certain flow resistance which depends also on the position of the spool within the housing. In a neutral position there is no flow path from the supply port to the working port arrangement.

When the hydraulic arrangement is used in connection with a lifting device, like a crane, the hydraulic motor is used to lift or lower a load or to actuate other parts of the crane, like a rotational drive. In this and in other cases, several safety requirements must be fulfilled.

SUMMARY

It is an object of the invention to show a simple way to achieve a safety functionality of a hydraulic arrangement.

This object is solved with the hydraulic arrangement as described at the outset in that the housing comprises a pilot pressure relief port connected to the return port via a shut-off valve and the spool after a predetermined stroke opens a connection between the pressure chamber and the pilot pressure relief port.

In this way it is possible to establish a mode of operation in which the flow of hydraulic fluid from the supply port to one of the working ports is limited. This limitation can simply be achieved by opening the shut-off valve. When the shut-off valve is opened and the spool in the housing has been moved by the predetermined stroke, the hydraulic fluid producing the pilot pressure in the pressure chamber is released to the return port, so that the pressure in the pressure chamber cannot further increase and cannot drive the spool further. This is in particular the case when a restoring spring acts on the spool against the force of the pilot pressure in the pressure chamber. However, when full flow is desired, the shut-off valve is closed, so that the pilot pressure can build up in the pressure chamber and the stroke of the spool within the housing is no longer restricted.

Accordingly, the hydraulic arrangement includes a safe limited flow function. The safety functionality is implemented in the form of a safe limited flow. The safe limited flow function is controlled via the shut-off valve. The full flow is only allowed while the shut-off calve is closed.

For example, the hydraulic arrangement can be used to control a hydraulic consumer, like a hydraulic motor or a hydraulic actuator; e.g. in connection with a lifting device, like a crane, where the hydraulic motor is used to lift or lower a load and/or to actuate other parts of the crane, like a rotational drive. According to another aspect, the hydraulic arrangement can be used in connection with a hydraulic steering device. For the hydraulic steering device, the safety functionality requirements are very important as well.

In an embodiment of the invention the pilot pressure relief port is connected to a pilot pressure relief chamber. In this case the pilot pressure relief chamber can be connected to the return port. This simplifies the construction.

In an embodiment of the invention an area of a connection between the pressure chamber and the pilot pressure relief chamber increases gradually after the predetermined stroke of the spool. This means that the pilot pressure in the pressure chamber is not suddenly lowered to the pressure at the return port but decreases only with an increasing stroke of the spool, so that the movement of the spool is not abruptly interrupted. This increases the comfort for the user of a hydraulic consumer, for example, when the hydraulic consumer is a motor rotating an upper part of an excavator with respect to a lower part.

In an embodiment of the invention the shut-off valve comprises actuating means actuating the shut-off valve. This means that the shut-off valve can be remotely controlled. The direct access of an operator to the shut-off valve is not required.

In an embodiment of the invention the actuating means are in form of a solenoid. The shut-off valve can be activated electrically. Thus, an auxiliary energy can be used which is available in most cases.

In an embodiment of the invention the actuating means are connected to a condition sensor arrangement sensing at least a working condition of the hydraulic arrangement and the actuating means activate the shut-off valve depending on the at least one working condition of the hydraulic arrangement. In this case the flow of hydraulic fluid to the working port and to the motor or consumer connected to the working port can be adapted to the working condition of the hydraulic arrangement. If, for example, the working port is connected to parts of a crane or an excavator, the speed of movement of these parts should be adapted to the load handled by the crane or excavator. When the load is heavy, the movement speed should be low to avoid dangerous situations. When the hydraulic arrangement is part of the hydraulic steering of the vehicle, the steering speed can be adapted to the driving speed of the vehicle.

In an embodiment of the invention the spool is movable in two directions opposite to each other, wherein a pressure chamber is provided for each direction of stroke, and the spool after a predetermined stroke in one direction opens a connection between one of the pressure chambers and the pilot pressure relief chamber and the spool after a predetermined stroke in the other direction opens a connection between the other of the pressure chambers and the pilot pressure relief chamber. The valve can thus control the operation of the motor or consumer connected to the working port arrangement in two directions. Safety can be achieved for both directions.

In an embodiment of the invention the predetermined stroke is the same for both directions. Thus, the same behavior can be achieved for both directions of operation.

In an embodiment of the invention the shut-off valve is open in an inactivated condition. Thus, when no auxiliary energy is available to actuate the shut-off valve, the shut-off valve is in a condition in which the flow through the hydraulic arrangement is limited. For example, the shut-off valve may be biased to (automatically) open, e.g. mechanically biased when the shut-off vale is not activated. In one embodiment, the shut-off valve is spring-biased to open. The actuating means may be configured to close the shut-off valve (against the bias) if the shut-off valve is in an activated condition, e.g. being electrically activated.

BRIEF DESCRIPTION OF THE DRAWINGS

An embodiment of the invention will now be described with reference to the drawing, in which.

DETAILED DESCRIPTION

Figure 1:
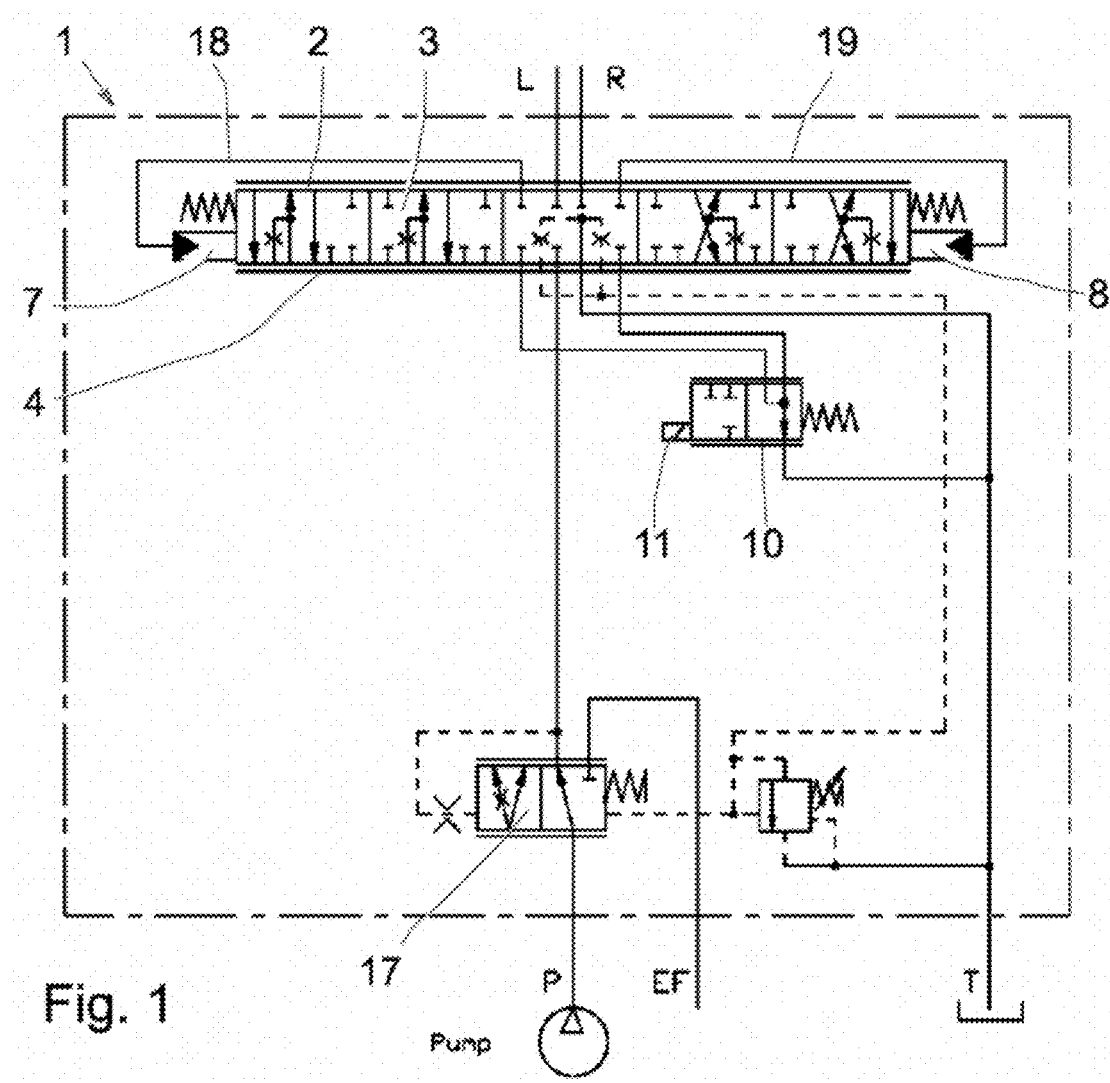
FIG. 1: schematically shows a hydraulic diagram of a valve arrangement.

FIG. 1 shows schematically a hydraulic diagram of a valve arrangement 1. The valve arrangement 1 comprises a supply port P, a return port T, a working port arrangement having two working ports L, R, and a valve 2. The valve 2 controls the flow of hydraulic fluid from the supply port P to one of the working ports L, R. To this end the valve 2 comprises a spool 3 which is arranged in a housing 4 and can be moved in the lengthwise direction within the housing 4. The spool 3 and the housing 4 together form variable orifices or bleeds which are schematically indicated in the spool 3 shown in FIG. 1. Depending on the position of the spool 3 in the housing 4 these orifices or bleeds are opened or closed to form a flow path between the supply port P and the working port arrangement L, R or not. When orifices are open, hydraulic fluid can flow from the supply port P to one of the working ports L, R. When the orifices are closed such the flow is interrupted.

The position of the spool 3 within the housing 4 determines which of the working ports L, R is supplied with hydraulic fluid from the supply port P. Furthermore, the position of the spool 3 in the housing 4 determines the size of the flow of the hydraulic fluid. The larger the stroke of the spool 3 out of the neutral position the larger the area of the orifices and the larger the flow of fluid.

The spool 3 is held or pretensioned in the position by means of springs 5, 6 which are equally dimensioned and act on to the spool 3 with the same force. The housing 4 is provided on both sides of the spool 3 in the longitudinal direction with a pressure chamber 7, 8. The pressure chambers 7, 8 are connected to the source of the pilot pressure, as it is known in the art. When a left pilot pressure 21 in pressure chamber 7 is larger than a right pilot pressure 22 in the pressure chamber 8 the spool 3 is moved to the right to allow supply of hydraulic fluid to the left working port L ("left stroke"). When the right pilot pressure 22 in pressure chamber 8 is larger than the left pilot pressure 21 in pressure chamber 7, the spool 3 is moved to the left to allow supply of hydraulic fluid to the right working port R ("right stroke").

Briefly spoken, maximum flow is adjusted when the spool 3 has been moved by the maximum left stroke 15 (FIG. 2, in order to supply hydraulic fluid to the left working port L) or by the maximum right stroke 16 (in order to supply hydraulic fluid to the right working port R).

The housing 4 is provided with a pressure relief chamber 9. The pressure relief chamber 9 is connected to the return port T by means of pressure relief port 20 and a shut-off valve 10. The shut-off valve 10 is provided with actuating means 11, in the present embodiment in form of the solenoid.

When the actuating means 11 are not activated, the shut-off the valve 10 is open and directly connects the pressure relief chamber 9 to the return port T. When the actuating means 11 are activated, for example, when the solenoid is provided with an electric current, the shut-off valve 10 is moved in a position, in which the connection between the pressure relief chamber 9 and the return port T is interrupted.

The pressure relief chamber 9 is closed by the spool 3 when the spool 3 is in the neutral position. This means that there is no connection between the pressure chambers 7, 8 and the pressure relief port 20. The pressure relief chamber 9 remains closed during a first part of a stroke of the spool 3. This is indicated by a minimum left stroke 13 and a minimum right stroke 14. During the minimum left stroke 13 and the minimum right stroke 14 the pressure in the pressure chambers 7, 8 is exclusively determined by the pilot pressures 21, 22 mentioned above.

However, when the spool 3 should be moved more than the minimum left stroke 13 and the minimum right stroke 14, this is only possible when the shut-off valve 10 is closed. When the shut-off valve 10 is open, as shown in FIG. 2, there is a connection between the respective pressure chamber 7, 8 and the pressure relief port 20 via the pressure relief chamber 9 and the hydraulic fluid producing this pressure in the respective pressure chamber 7, 8 is released to the pressure relief chamber 9 and from there to the return port T.

Figure 2:
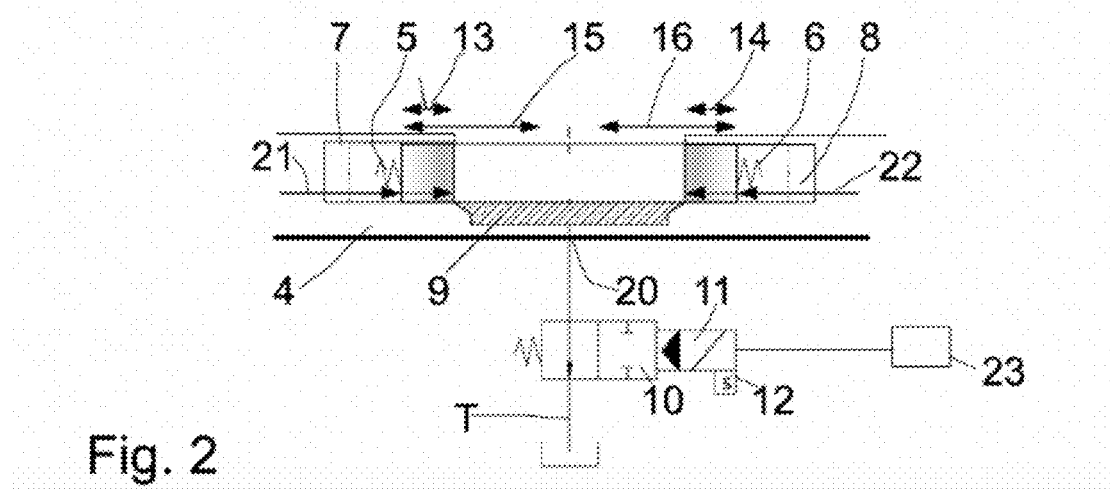
FIG. 2: schematically a spool of a valve of the hydraulic diagram shown in FIG. 1.

As is shown in FIG. 2, a size or area of a connection between the respective pressure chamber 7 and the pressure relief chamber 9 increases with the stroke of the spool 3, i.e., there is no abrupt lowering of the pressure in the respective pressure 7, 8.

The stroke of the spool 3 until a connection between the respective pressure chamber 7, 8 and the pressure relief chamber 9 is established is the same for both moving directions of the spool 3.

When the shut-off valve 10 is closed, there is no possibility for the hydraulic fluid in the respective pressure chambers 7, 8 to flow out of the pressure relief chamber 9 to the return port T. In this case, hydraulic fluid supplied to the respective pressure chamber 7, 8 moves the spool 3 further, so that the maximum left stroke 15 or the maximum right stroke 16 can be achieved. It should be noted that spool 3 can be positioned in any position between neutral and maximum stroke 15, 16 (when the shut-off valve 10 is closed) or between neutral and minimum stroke 13, 14 (when the shut-off valve 10 is open).

FIG. 1 shows, how the valve 2 is arranged within the hydraulic arrangement 1. The pressure port P is connected to the valve 2 via a priority valve 17. Means for generating the controlled pilot pressures 21, 22 actuating the spool 3 are not shown but known in the art. Lines 18, 19 are shown connecting the respective pressure chambers 7, 8 to the shut-off valve 10 when the spool 3 is moved more than the minimum stroke 13, 14. As illustrated in connection with FIG. 2, there may be a variable orifice between the respective pressure chamber 7, 8 and the shut-off valve 10. However, this is only an option and therefore not shown in FIG. 1.

The hydraulic arrangement can include a status sensor means 12. The status sensor means 12 is configured to provide information whether the flow limitation is enabled or not. For example, the status sensor means 12 may be coupled to the shut-off valve 10 and configured to detect whether the shut-off valve 10 is open or closed. In this embodiment, the status sensor means 12 is coupled to the actuating means 11. It may determine whether the shut-off valve is activated (closed) by the actuating means 11 or not activated (i.e. the shut-off valve 10 is open).

Optionally, the actuating means 11 are connected to a condition sensor means 23 as shown in FIG. 2. The condition sensor means 23 is configured to sense at least a working condition of an environment in which the hydraulic arrangement 1 is used. When, for example, the hydraulic arrangement 1 is used in an excavator or a crane, the conditions sensor means 23 can detect the load to be moved by the excavator or the crane. When the hydraulic arrangement 1 is used in a vehicle, for example, in combination with a steering arrangement, the condition sensor means 23 can be used to detect the speed and/or the load of the vehicle. When the load or the speed are high, no fast movement of a hydraulic motor connected to the working port arrangement L, R should be possible.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic arrangement comprising a supply port, a return port, a working port arrangement, and a valve controlling a supply of hydraulic fluid from the supply port to the working port arrangement, wherein the valve comprises a housing and a spool movable in lengthwise direction in the housing and forming together with the housing at least one flow path the resistance of which depends on the position of the spool in the housing, and the spool is actuated by a hydraulic pilot pressure in a pressure chamber, wherein the housing comprises a pilot pressure relief port connected to the return port via a shut-off valve and the spool after a predetermined stroke opens a connection between the pressure chamber and the pilot pressure relief port,
wherein the spool is movable in two directions opposite to each other, wherein a pressure chamber is provided for each direction of stroke, and wherein the spool after a predetermined stroke in one direction opens a connection between one of the pressure chambers and the pilot pressure relief port and the spool after a predetermined stroke in the other direction opens a connection between the other of the pressure chambers and the pilot pressure relief port.

2. The hydraulic arrangement according to claim 1, wherein the pilot pressure relief port is connected to a pilot pressure relief chamber provided in the housing.

3. The hydraulic arrangement according to claim 2, wherein at least a portion of a sidewall of the pilot pressure relief chamber is slanted such that an area of a connection between the pressure chamber and the pilot pressure relief chamber increases after the predetermined stroke of the spool.

4. The hydraulic arrangement according to claim 1, wherein the shut-off valve comprises actuating means actuating the shut-off valve.

5. The hydraulic arrangement according to claim 4, wherein the actuating means are in form of a solenoid.

6. The hydraulic arrangement according to claim 4, wherein the actuating means are connected to a condition sensor arrangement sensing at least a working condition of the hydraulic arrangement and the actuating means activate the shut-off valve depending on the at least one working condition of the hydraulic arrangement.

7. The hydraulic arrangement according to claim 1, wherein a pilot pressure relief chamber is provided in the housing, and wherein the spool after the predetermined stroke in one direction opens a connection between one of the pressure chambers and the pilot pressure relief chamber and the spool after the predetermined stroke in the other direction opens a connection between the other of the pressure chambers and the pilot pressure relief chamber.

8. The hydraulic arrangement according to claim 1, wherein the predetermined stroke is the same for both directions.

9. The hydraulic arrangement according to claim 1, wherein the shut-off valve is open in an inactivated condition.

10. The hydraulic arrangement according to claim 2, wherein the shut-off valve comprises actuating means actuating the shut-off valve.

11. The hydraulic arrangement according to claim 3, wherein the shut-off valve comprises actuating means actuating the shut-off valve.

12. The hydraulic arrangement according to claim 5, wherein the actuating means are connected to a condition sensor arrangement sensing at least a working condition of the hydraulic arrangement and the actuating means activate the shut-off valve depending on the at least one working condition of the hydraulic arrangement.

13. The hydraulic arrangement according to claim 2, wherein the spool after the predetermined stroke in one direction opens a connection between one of the pressure chambers and the pilot pressure relief chamber and the spool after the predetermined stroke in the other direction opens a connection between the other of the pressure chambers and the pilot pressure relief chamber.

14. The hydraulic arrangement according to claim 3, wherein the spool after the predetermined stroke in one direction opens a connection between one of the pressure chambers and the pilot pressure relief chamber and the spool after the predetermined stroke in the other direction opens a connection between the other of the pressure chambers and the pilot pressure relief chamber.

15. The hydraulic arrangement according to claim 4, wherein a pilot pressure relief chamber is provided in the housing, and wherein the spool after the predetermined stroke in one direction opens a connection between one of the pressure chambers and the pilot pressure relief chamber and the spool after the predetermined stroke in the other direction opens a connection between the other of the pressure chambers and the pilot pressure relief chamber.

16. The hydraulic arrangement according to claim 8, wherein a pilot pressure relief chamber is provided in the housing, and wherein the spool after the predetermined stroke in one direction opens a connection between one of the pressure chambers and the pilot pressure relief chamber and the spool after the predetermined stroke in the other direction opens a connection between the other of the pressure chambers and the pilot pressure relief chamber.

17. The hydraulic arrangement according to claim 9, wherein a pilot pressure relief chamber is provided in the housing, and wherein the spool after the predetermined stroke in one direction opens a connection between one of the pressure chambers and the pilot pressure relief chamber and the spool after the predetermined stroke in the other direction opens a connection between the other of the pressure chambers and the pilot pressure relief chamber.

\* \* \* \* \*